United States Patent [19]

De Coene et al.

[11] Patent Number: 4,478,027
[45] Date of Patent: Oct. 23, 1984

[54] MOWER-CONDITIONER

[75] Inventors: Frans J. G. C. De Coene; Adrianus Naaktgeboren, both of Zedelgem, Belgium

[73] Assignee: Sperry Corporation, New Holland, Pa.

[21] Appl. No.: 374,590

[22] Filed: May 3, 1982

[30] Foreign Application Priority Data

May 8, 1981 [GB] United Kingdom ................. 8114061

[51] Int. Cl.$^3$ ..................... A01D 55/18; A01D 57/30; A01D 82/00
[52] U.S. Cl. ..................................... 56/16.4; 56/13.6; 56/192; 56/DIG. 1
[58] Field of Search ....................... 56/12.4, 13.6, 157, 56/192, 193, DIG. 1, DIG. 5, 16.4

[56] References Cited

U.S. PATENT DOCUMENTS

| | | | |
|---|---|---|---|
| 3,699,755 | 10/1972 | Hauser | 56/DIG. 1 |
| 4,188,773 | 2/1980 | Kactzel | 56/DIG. 1 |
| 4,199,922 | 4/1980 | Van der Lely | 56/192 |
| 4,215,526 | 8/1980 | Van der Lely | 56/12.7 |
| 4,233,805 | 11/1980 | Van der Lely | 56/192 |
| 4,251,981 | 2/1981 | Van der Lely | 56/192 |
| 4,267,688 | 5/1981 | Vissers et al. | 56/16.4 |

FOREIGN PATENT DOCUMENTS

| | | | |
|---|---|---|---|
| 2730211 | 2/1978 | Fed. Rep. of Germany | 56/DIG. 1 |
| 1603343 | 11/1981 | United Kingdom | |
| 2081566 | 2/1982 | United Kingdom | 56/16.4 |

Primary Examiner—Gene Mancene
Assistant Examiner—John G. Weiss
Attorney, Agent, or Firm—Larry W. Miller; Frank A. Seemar; Darrell F. Marquette

[57] ABSTRACT

A satellite mower-conditioner comprising a frame, a pair of rotary members mounted on the frame and rotatable about generally upright axes with each rotary member having mounted thereon for rotation therewith a plurality of rotary cutter units rotatable also about respective generally upright axes offset from the rotational axis of the rotary member, two sets of tines stationarily mounted on the frame and associated with the respective rotary members such that the tines of one set define, generally between the rotary members, an angle with the corresponding tines of the other set, and at least two additional sets of tines mounted for rotation with the respective rotary members. The rotatably mounted tines are arranged to cooperate with the stationarily mounted tines to condition cut crop therebetween, the rotatably mounted tines also serving to engage crop as it is being cut and carry the cut crop between the two rotary members to, and between, the stationary sets of tines, and finally to disengage the crop rearwardly of the rotary members.

25 Claims, 6 Drawing Figures

MOWER-CONDITIONER

BACKGROUND OF THE INVENTION

This invention relates to agricultural machines known as mower-conditioners. A mower-conditioner combines, in a single machine, the actions of crop mowing or cutter and crop conditioning. More particularly, the present invention is applicable on mower-conditioners employing so-called "satellite" mowers in which at least one disc-type cutter unit is rotatable about its own axis and also rotatable about an axis of a member, such as a drum, on which it is mounted.

In order to realise the full potential of the disc-type cutter, it is necessary to clear cut crop material therefrom immediately cutting has taken place. If cut crop material is allowed to dwell on the disc-type cutters, it increases the load on the latter so that more power is consumed and also there is a high risk of the crop being further acted upon by the cutters to produce short pieces of cut crop which normally is undesirable.

However, in mower-conditioners the clearing of cut crop from the cutter units has to be consistent with carrying out an effective conditioning action on the cut crop and it is an object of the present invention to meet this requirement.

SUMMARY OF THE INVENTION

According to the present invention a mower-conditioner comprises a frame, a pair of rotary members mounted on the frame and rotatable about generally upright axes at a first rotational speed. At least one rotary cutter unit associated with each rotary member and rotatable at another rotational speed, two first sets of stationary elements mounted on the frame and associated with respective rotary members such that the elements of one set define, generally between the rotary members, an angle with the corresponding elements of the other set, and at least two second sets of elements mounted for rotation with respective rotary members, the elements of each second set being arranged to cooperate with the elements of both of the two first sets so as, in use, to condition cut crop therebetween, the elements of the second sets also serving to engage crop on being cut and carry the cut crop between the two rotary members to, and between, the two first sets of elements, and finally to disengage the crop rearwardly of the rotary members.

Preferably each rotary cutter unit is mounted on the associated rotary member for rotation therewith about the generally upright axes thereof, and is rotatable about a further generally upright axes offset from the rotational axis of the respective rotary member. Preferably two rotary cutter units are provided per rotary member.

The elements of each first set preferably are formed by vertically spaced apart tines and the elements of each second set are also formed by vertically spaced apart tines which are arranged so as to alternate with the tines of the first sets. The tines of each first set may be mounted on the frame by respective support members which extend partially around the associated rotary member at the forward side thereof.

Each tine of each first set is adjustably mounted on the associated support member, thereby allowing the angle defined between corresponding tines to be varied. Preferably, each tine of each first set is mounted on the associated support member via resilient means which allow the tine to move relative to the support member to permit the passage of crop material between the two first sets of tines, assisted by the second sets of tines. Each support member may be cantilevered from the frame and comprise a linear portion extending from the rear of the machine along one side thereof, and a curved portion extending partially around the front of the associated rotary member. In this way, the support members also serve to support the cut crop in a generally vertical position as it is being swept to the first sets of tines by the second sets of tines, which assists in uniform conditioning.

The tines of each second set may each be elongated and mounted at one end on the associated rotary member with the other end free to engage crop material and being inclined relative to the main body of the tine. With this arrangement, each tine of each second set is adjustably mounted whereby it can be positioned such that said other end either extends generally radially of the associated rotary member or trails said generally radially extending position, as seen in the direction of rotation of the associated rotary member. Each tine of each second set may be of rod form and mounted on the associated rotary member for rotational movement about the longitudinal axis of the main body, latch means being provided to retain the tine in said generally radial or trailing position. Alternatively, the tines of each second set may be ganged together for movement between the generally radial and trailing positions.

BRIEF DESCRIPTION OF THE DRAWINGS

A satellite mower-conditioner embodying the present invention will now be described in greater detail, by way of example, with reference to the accompanying drawings, in which.

DETAILED DESCRIPTION OF THE PREFERRED EMBODIMENT

Figure 1:
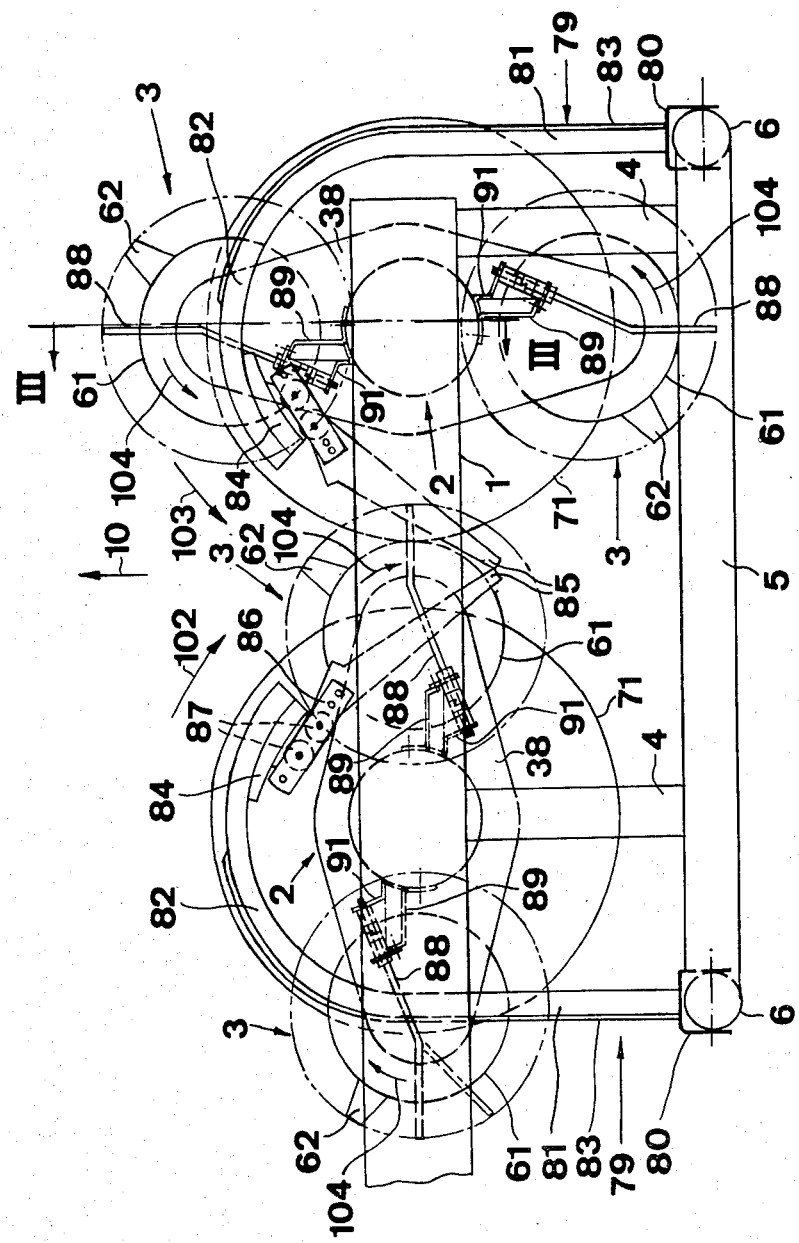
FIG. 1 is a plan view of the mower-conditioner.

Referring more particularly to FIGS. 1 to 4, the mower-conditioner comprises a main beam 1 by which the machine can be attached, in conventional manner, to the three-point linkage system of a tractor. Depending from the beam 1 are two rotary members or drums 2 each of which has two rotary cutter units 3 rotatable about axes offset from the rotational axis of the associated drum so as to provide a satellite mower construction. Extending rearwardly from the beam 1, and attached thereto, are two arms 4 which support an inverted U-shaped structure having a main limb 5 extending generally parallel to the beam 1, and two smaller limbs 6 at right angles to the main limb and generally parallel to the rotational axes of the drums 2.

Figure 2:
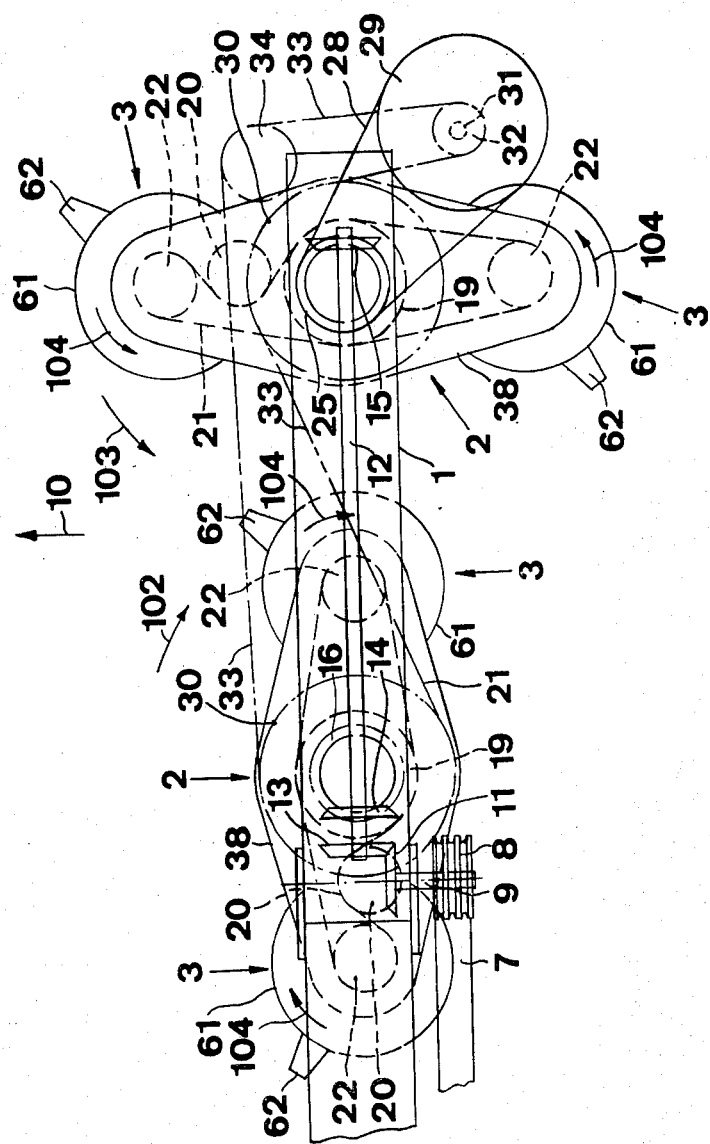
FIG. 2 is a view similar to FIG. 1 but omitting certain components and showing various drive arrangements of the machine.
Figure 4:
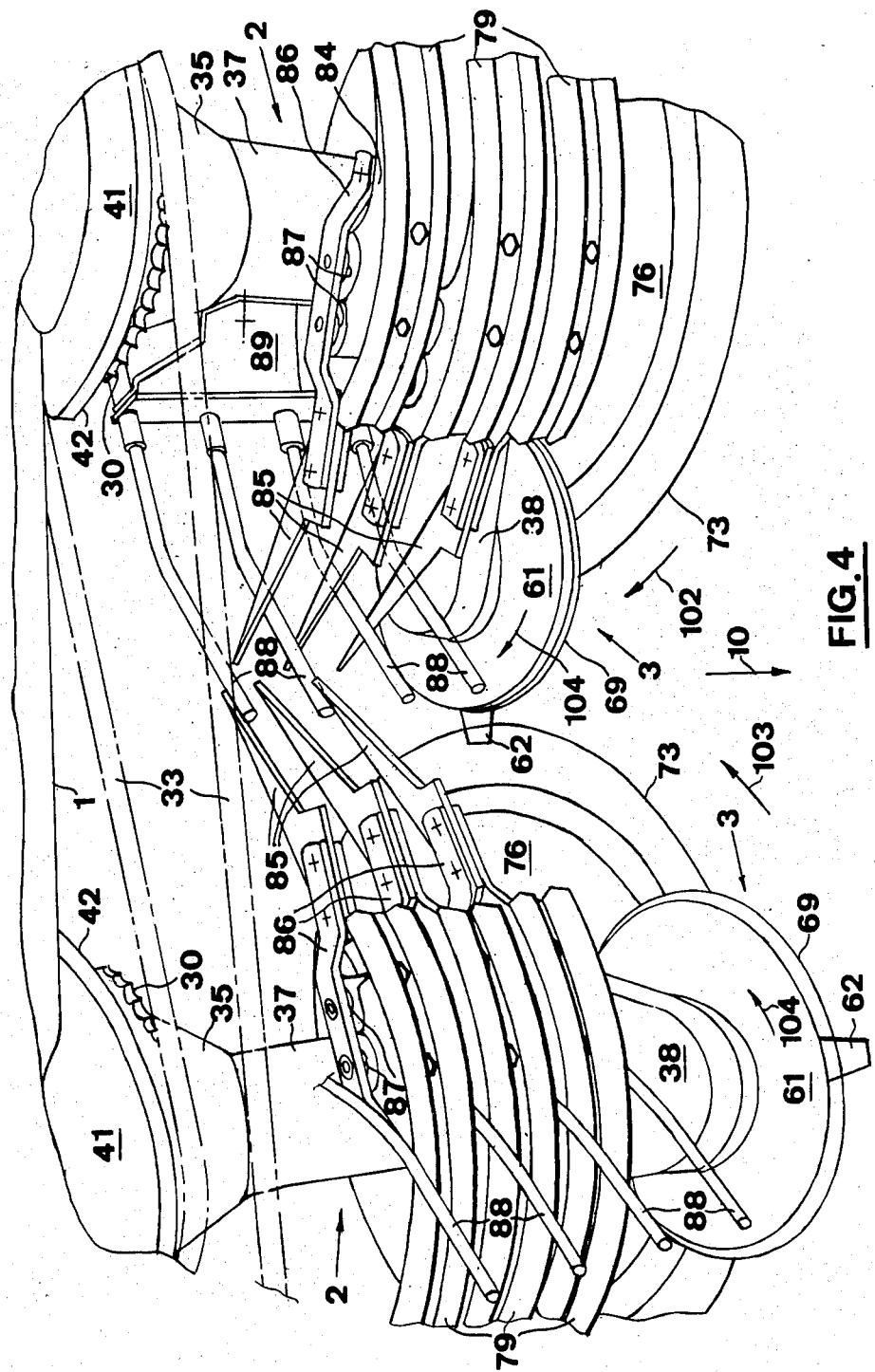
FIG. 4 is a partial perspective view of the machine from the front.

"Front" and "rear" references relate to the forward direction of operative travel of the machine, and "right" and "left" references are determined by standing to the rear of the machine and facing in the direction of operative travel which is indicated by arrow 10 in FIGS. 1,2 and 4.

Figure 3:
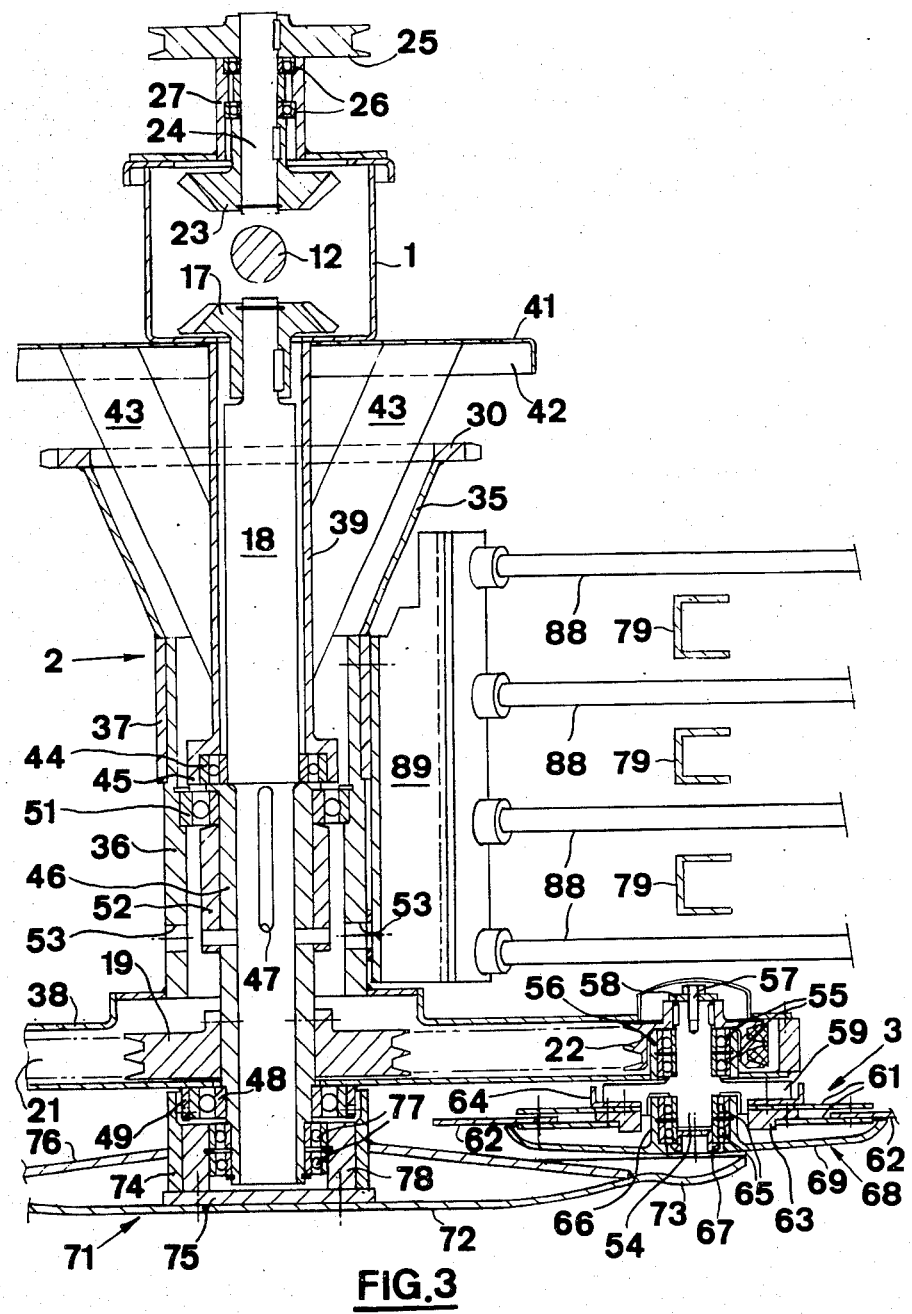
FIG. 3 is a section, to a larger scale, on the line III - III of FIG. 1.

The limbs 6 support components which relate to the crop conditioning aspects of the machine and these will be described hereinafter. Reference will first be made to the various drive arrangements of the machine which are best illustrated in FIGS. 2 and 3. Drive for all the rotating components of the machine is taken from the power take-off (PTO) of the tractor or other vehicle to which the mower-conditioner is fitted via a belt 7 which extends around a pulley 8 mounted on one end of a shaft 9 (FIG. 2). The beam 1 is hollow and of rectangular section (as seen in FIG. 3) and the shaft 9 extends through, and is journalled in, a side of the beam and carries at its other end within the beam a bevel gear 11.

A shaft 12 extends centrally within the beam between the two drums 2 and carries at the left-hand end a bevel gear 13 which meshes with the bevel gear 11, the two bevel gears 11 and 13 allowing pivotal movement of the mower-conditioner relative to the tractor without any interference with the drive from the PTO. The shaft 12 has two further bevel gears 14 and 15 attached thereto which mesh with bevel gears 16 and 17, centrally, and generally vertically, through the respective drums 2 (FIG. 3). Each shaft 18 has attached to it towards its lower end a pulley 19 engaged by a belt 21 which also wraps around two pulleys 22 forming parts of the respective cutter units 3 associated with the drum 2 to which the shaft 18 relates, and around an idler/tension pulley 20. Thus the cutter units 3 are driven from the tractor PTO and although the two shafts 18 are driven in timed relationship through the various bevel gears, it will be noted that the cutter units 3 are driven by belts so that the one is not timed with respect to any other three.

Turning now to the drive arrangement for the drums 2, the right-hand bevel gear 15 on the shaft 12 meshes with another bevel gear 23, in addition to the bevel gear 17, which is attached to one end of a short shaft 24 the other end of which carries a pulley 25 externally of the beam 1 as shown in FIG. 3. The shaft 24 is supported in spaced bearings 26 housed in a cylindrical casing 27 attached to the top of the beam 1. As shown in FIG. 2, the pulley 25 is engaged by a belt 28 which also extends around a pulley 29 attached to the upper end of a generally vertical shaft 31, the lower end carrying a sprocket 32. It should be noted that, for clarity, the components 24,25,28,29,31 and 32 have been omitted from FIG. 1.

A chain 33 extends around the sprocket 32, and idler/tension sprocket 34, and sprockets 30 forming part of the drums 2. Thus the two drums 2 are driven, in opposite directions, in timed relationship from the tractor PTO via the shafts 12, 24 and 31. It is because the drums 2 are driven in timed relationship and because the lines through the centers of respective pairs of cutter units 3 are initially set at right angles that there is no need for a timed drive to the cutter units 3.

With further particular reference to FIG. 3, each drum comprises a casing formed by an upper frustoconical portion 35 to which the sprocket 30 is attached, and a lower cylindrical portion 36 to which the portion 35 is connected via a cylindrical extension 37 which fits over the portion 36. The lower end of the cylindrical portion 36 of the drum casing carries a generally elliptical hollow casing 38 (as seen in FIGS. 1 and 2) in which are housed the pulleys 19 and 22 and cooperating belt 21. The shaft 18 extends through the associated drum casing and these two components are mounted for individual rotation independently of each other on a stationary structure comprising a hollow cylindrical member 39 attached to the underside of the beam 1 via an annular plate 41 having a downwardly-extending flange 42. A pluraltiy of inclined struts 43 extend between the plate 41 and the member 39 to impart the required robustness and rigidity to the structure, bearing in mind that the entire weight of the drum 2 and associated cutter units 3 is carried by these components and, in turn, by the beam 1.

The shaft 18 extends through, and beyond, the member 39, being supported for rotation in a first bearing 44 housed in an enlarged portion 45 of the member 39. The portion of the shaft 18 which extends beyond the member 39 is of reduced diameter and has a sleeve 46 keyed to it (the key slot being seen at 47 in FIG. 3). Towards the lower end of the sleeve 46 there is formed an annular recess which receives the inner race of a bearing 48, the outer race being housed in a collar 49 attached to the underside of the casing 38 and retained therein by grub screws. The pulley 19 is connected to the sleeve 46 so as to be rotated when the shaft 18 is driven. Thus the shaft 18 is mounted for rotation and is supported by bearings 44 and 48. With respect to the drums 2, the casing of each is mounted for rotation on the sleeve 46 via a bearing 51, the outer race of which is retained in an interior recess in the cylindrical portion 36 of the drum casing and the inner race of which is mounted on the upper end of the sleeve 46 and is retained in position by a further sleeve 52 secured over part of the sleeve 46 by grub screws, access to which can be gained through apertures 53 in the drum casing portion 36. Each drum 2 is supported for rotation at its lower end by the associated bearing 48 which thus serves both the shaft 18 and the drum casing.

The cutter units 3 on each drum 2 are equispaced from the shaft 18 and are each mounted for rotation on a shaft 54 the upper end of which extends into the casing 38 through an aperture in the bottom of the latter and is supported by a pair of bearings 55 within the housing 38. The bearings 55 are carried by a collar 56 upstanding from the bottom of the casing 38 and are retained by a circlip. The associated pulley 22 is keyed to the upper end of the shaft 54 and is retained thereon by a bolt 57 and a washer 58. The shaft 54 is formed with an integral, radially-extending flange 59 disposed outside and immediately beneath the casing 38. Attached to the flange are a pair of spaced annular plates 61 between which are mounted for free pivotal movement two diametrically opposed cutter blades or knives 62. The plates 61 are spaced by a spacer 63 and a shiled with an upstanding flange 64 is disposed between the upper plate 61 and the flange 59.

The lower end of the shaft 54 supports via a pair of bearings 65 a freely rotatable shield 68. The shield 68 comprises a collar 66 which is retained on the shaft 54 by a circlip and an end cap 67, respectively. The main member 69 of the shield 68 is of circular, dished construction and has a diameter such that its periphery is disposed slightly radially beyond the outer edge of the lower plate 61. The dished nature of the shield 68 enables the periphery of the member 69 thereof to lie close to the lower plate 61 and to the knives 62 so as to shield the underside of the lower plate, the knife connection points, and the lower end of the shaft 54 from contact with the ground and from the ingress of dirt or other foreign matter. It will be noted that the bearings 65 serve both the freely rotatable shield 68 and the shaft 54 which is driven at a relatively high speed via the shaft 18, the pulleys 19 and 22 and the belt 21.

A freely rotatable, ground-engageable, circular skid 71 is provided on the lower end of the shaft 18 of each drum 2, the skid comprising a lower, generally dished member 72 with a further dished peripheral portion 73, and a hub formed by a collar 74 fitted with a bottom plate 75 which is also attached to the member 71. An annular reinforcing member 76 interconnects the hub 74 and the member 72. The skid 71 is mounted for rotation in a pair of bearings 77, the inner races of which are accommodated in a recess in the outer end of the sleeve 46 and the outer races of which are housed in a sleeve 78 fitting within the hub 74. The upper bearing 77 is retained by a circlip in the sleeve 78, and the lower bearing 77 by a circlip on the sleeve 46. Thus the sleeve 78 is supported on the sleeve 47, and hence shaft 18, and in turn supports the skid 71 which is bolted thereto through the hub plate 75. The hub 74 is counterbored at the upper end to provide a clearance between it and the roller 49 of the casing 38, this clearance forming part of a labyrinth seal for the bearings 48 and 77. It will be noted that the diameter of the skid 71 is such that the peripheral portion 73 extends slightly radially beyond the centers of the associated cutters 3 and is spaced closely below the respective shields 68 of the cutters.

The components so far described relate, in the main, to the mowing aspect of the machine and reference will now be made to those components which contribute to the crop conditioning aspect of the machine. As already mentioned, the limbs 6 of the inverted U-shaped structure carried by the arms 4 support some of the crop conditioning components. More particularly, each limb 6 has attached thereto the ends of three support members 79 which are equispaced along the limb and extend forwardly of the machine first in a linear manner and then curve partially around the associated drum as indicated at 81 and 82, respectively, in FIG. 1. The supports 79 are thus in the form of cantilevers and are attached to the associated limb 6 via a U-shaped bracket 80.

Each support 79 is also of U-shaped cross-sectional configuration with the bridging limb being disposed generally vertically and towards the associated drum 2. The linear portion 81 and the first part of the curved portion 82 of each support 79 are closed by a plate 83 (FIG. 1). The remainder of the curved portion 82 of each support 79 is left open and to the bridging limb thereof is bolted a bracket 84 on which is mounted a stationary tine structure comprising a tine 85 and a bifurcated mounting bracket 86 each limb of which is attached to the bracket 84 via two resilient mounts 87 which allow some movement of the tine relative to the support 79. Each tine 85 extends rearwardly of the machine and towards the center of the space between the two drums 2. The supports 79, and hence the associated tines 85, associated with one drum 2 are generally aligned heightwise with the corresponding supports and tines of the other drum although this is not essential as they could be staggered in height.

Figure 5:
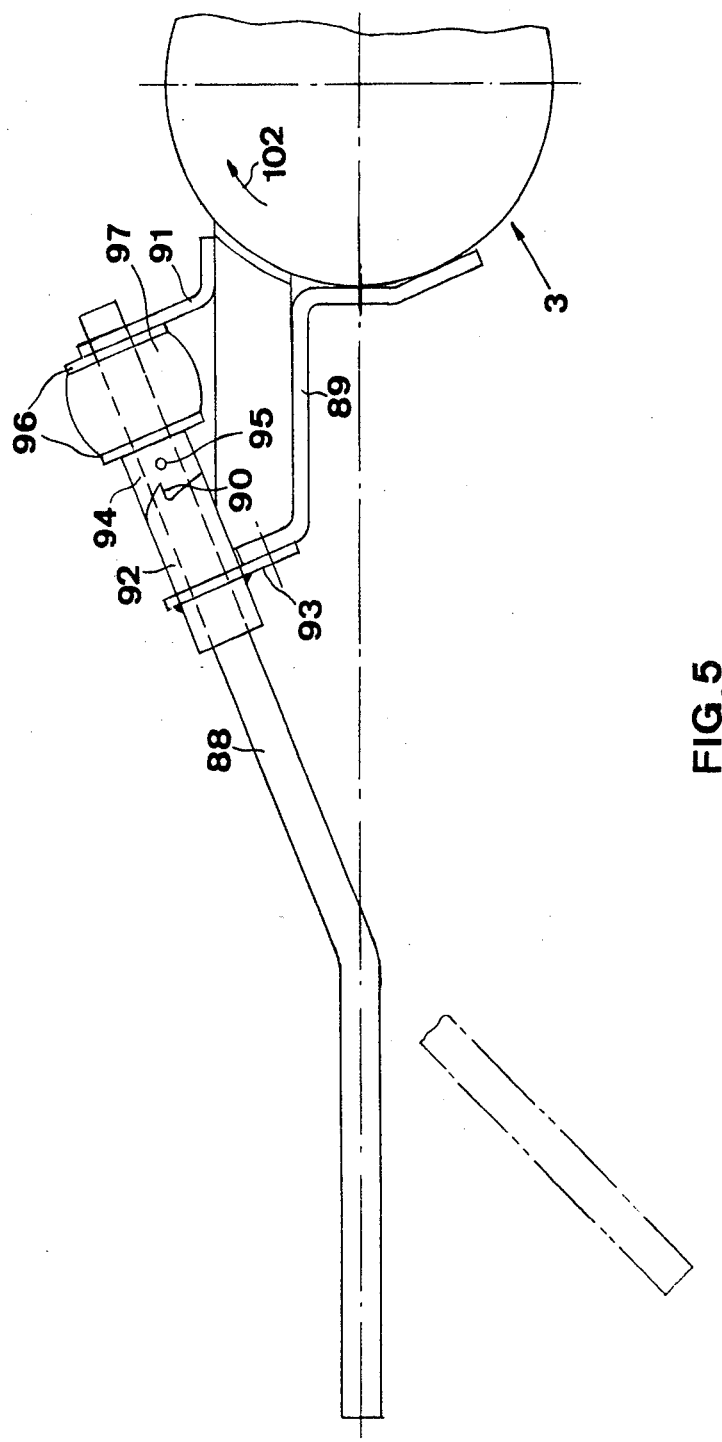
FIG. 5 is an enlarged view of a component of FIG. 1.

Each drum 2 carries two sets of tines 88, the sets being mounted on the drum casing components 36 and 37 at diametrically opposed points by respective brackets comprising spaced member 89 and 91 (see especially FIG. 5). Each tine 88 is of rod form and is inclined at its outer end to its own longitudinal axis. The connection of each tine 88 to the members 89 and 91 is such as to permit rotation, whereby the tines can be oriented as shown in full lines in FIGS. 1 and 5 or as shown in broken lines in those figures for a purpose to be described. More specifically, each tine 88 extends through a bush 92 fixed to the bracket member 89 via a plate 93, the end face of the bush disposed nearer to the bracket member 91 being formed with a cam profile having two diametrically opposed latching portions 90, one of which is seen best in FIG. 5. A complementary cam profile is provided on the adjacent end face of a sleeve 94 through which the tine 88 passes and to which it is also attached by a pin 95. The tine 88 then passes through a pair of thrust washers 96, between which is disposed a resilient block 97, with its inner end being journalled in an aperture in the bracket member 91.

To move a tine 88 from one operative position to another, all that is necessary is to grasp the outer end of the tine and rotate it in such a manner as to move the cooperating latching 90 portions away from each other until the one portion on one member 94 latches with the previously diametrically opposed latching portion on the other member 92. The axial movement of the tine 88 necessary for this movement to occur is accommodated by compression of the resilient block 97.

There are four tines 88 in each set and they are arranged to alternate with the fixed tines 85 and the associated supports 79. The length of each tine 88 is such as to ensure that they overlap with the adjacent tines 85 associated with both drums 2 and that they pass through the point at which the corresponding pair of tines 85 intersect or terminate. It is not essential that the corresponding pairs of tines 85 intersect and in the illustrated embodiment they terminate virtually at a common point. The tines 85 of a pair may be slightly spaced at their free ends. As regards the angle of the tines 85, each is disposed at approximately 30° with respect to the fore-and-aft centerline between the drums 2. Thus, cooperating pairs of tines 85 define an angle of 60° Indicentally, it should be noted that the position of each bracket 84 can be adjusted relative to the corresponding support 79 so as to vary the angle of the tines 85.

Figure 6:
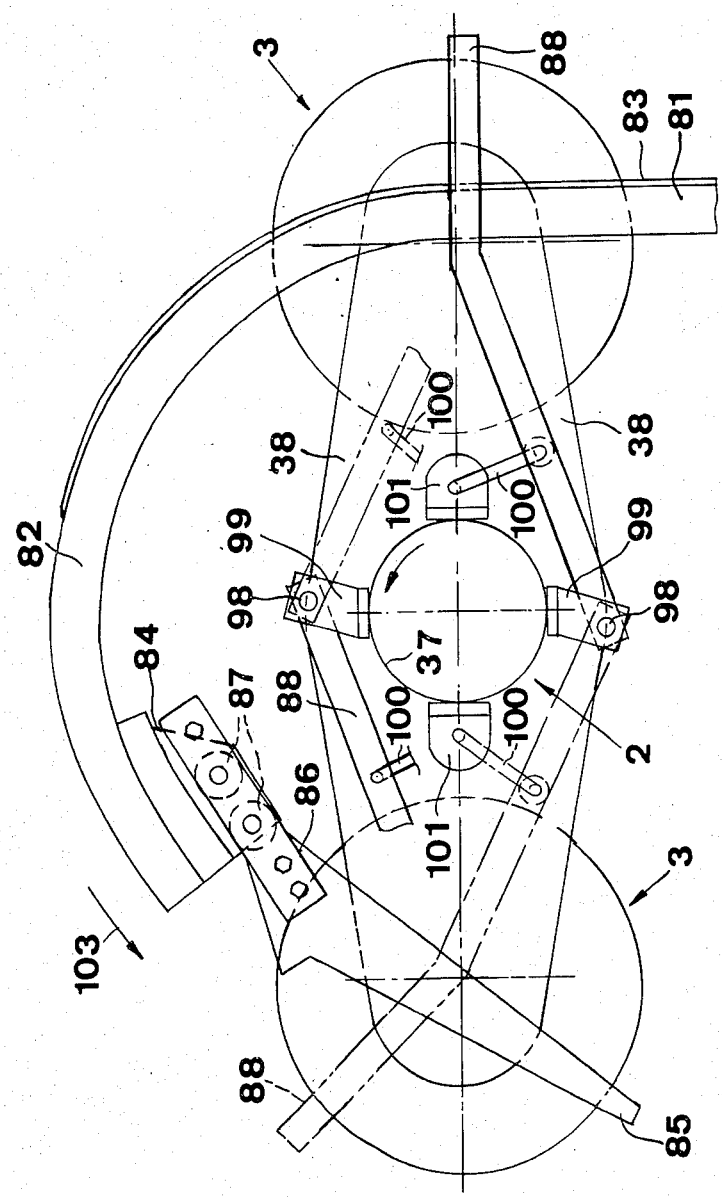
FIG. 6 is a partial view similar to that of FIG. 1 but showing an alternative component to that of FIG. 5.

FIG. 6 shows a modification of the mounting of the tines 88 with like components being given similar reference numerals. The tines 88 of each set are rigidly attached to a common shaft 98 journalled in upper and lower, spaced brackets 99 attached to the drum casing portions 37 and 36, respectively. Each set of tines 88 is retained in a selected position, such as the full line position of FIG. 6, by a link 100 pivotally attached at one end to the upper tine of the set and having a hook at the other end which engages an aperture in a bracket 101 attached to the drum casing portion 37. If the sets of tines 88 need to be moved so that their inclined outer and free ends are directed in the opposite direction, then the two links 100 on each drum are disengaged from the respective brackets 101, the sets rotated through approximately 225°, about the pivot axes of the shafts 98, to the broken line position of FIG. 6, and the links 100 re-engaged in the respective newly adjacent brackets 101.

When the machine is required for use, the tines 88 are first set to the required position which depends on whether a spreading action or a relatively narrow windrow is required. If a wide spreading action is required, the tines are each positioned so that their outer ends extend generally radially of the associated drums 2 (full line position in the drawings). It is noted that the drums 2 are counter-rotated in the direction of rotations indicated by the arrows 102 and 103 in FIGS. 1,2 and 4 in a manner such that they are moving from front to rear at the "nip". If a narrow windrow is required, the tines 88 are moved to the broken line position of the drawings in which the outer ends of the tines trail relative to said generally radial positions, when seen in said respective directions of rotation. The tines 88 are brought in these positions in the manner described with particular reference to FIG. 5, or to FIG. 6 if the modified tine arrangement is employed. A further alternative is to have the tines 88 of one drum 2 in the full line position with the tines 88 of the other drum in the broken line position, whereby the windrow is displaced towards one side of the machine.

With the tines 88 adjusted as required, the mower-conditioner is brought to the operative position by adjusting the tractor three-point linkage system so that the skids 71 lightly engage the ground. Drive from the tractor PTO is then initiated whereby the drums 2 rotate in the directions 102,103 (typically at about 290 r.p.m.) and the cutter units 3 rotate in the direction of arrows 104 (typically at 3430 r.p.m.). The tractor is then driven forward so that the machine is moved in the direction 10 into standing crop. The knives 62 of the cutter units 3 cut the crop as they rotate about their own axes (that of the shafts 54) and about the axes of the drums 2 (that of the shafts 18). Cut crop is engaged by the tines 88 and swept towards the "nip" of the drums 2, the crop being supported in a generally upright position during this movement by the supports 79. As the cut crop enters between the two drums 2, it is swept into the angle defined by cooperating pairs of fixed tines 85 and is thereby crimped or conditioned, the conditioned crop finally being passed through the pairs of fixed tines and then disengaged by the tines 88, the point of disengagement depending on the selected position of the tines 88. The resilient mounts 87 of the fixed tines 85 allow the cooperating pairs of the latter to move apart as the moving tines 88 sweep the crop therethrough.

It will be appreciated that the action of the tines 88 in first sweeping the cut crop between the two drums 2 is very positive as is the conditioning of the cut crop by the combined action of the moving tines 88 and the fixed tines 85. The conditioning action has three aspects:
  (i) The throwing of the cut crop by tines 88 onto the fixed tines 85.
  (ii) The squeezing of the cut crop in the angle defined by the respective cooperating pairs of tines 85.
  (iii) The cracking or crimping of the cut crop as it is forced between the cooperating pairs of fixed tines 85.

The point at which the cooperating pairs of tines 85 meet preferably lies behind a line of 15 cms being found acceptable in the case of the illustrated embodiment. It is necessary for each tine 88 to pass through the point at which cooperating pairs of tines 85 meet and preferably that they also cooperate with both sets of tines 85, as already mentioned. It has been found that the action of the tines 88, set in the windrowing position, is excellent in forming the desired windrow so that additional windrow-forming components are unnecessary.

In the illustrated embodiment, the number of sets of tines 88 equals the number of cutters 3 and whilst this has been found acceptable, this need not be so. It has been found to be advantageous to provide the sets of tines 88 substantially vertically above the cutter.

During the operation of the machine, the skids 71 engage the stubble left by the cutting of the crop material but this does not give rise to any appreciable undesirable forces since the skids are free to rotate and do so on engagement with the stubble or other objects such as rocks. The shields 68 also engage the stubble but again no undesirable forces are created as the shields are also freely rotatable. If the skids 71 and/or the shields 68 were driven, more power would be required to overcome the frictional forces arising out of contact with the stubble, etc. and furthermore, any rock or other solid object engaged by the skids or shields would tend to be propelled thereby with the likelihood of causing damage to the machine and/or to the operator than is the case with free-rotatable components. As already mentioned, the skids 71 and shields 68 also protect the associated components from wear (arising from otherwise direct contact with the ground) and from dirt which can impair operation. Nevertheless, neither the skids 71 nor the shields 68 detract from the effectiveness of the cutter units 3 so that the problem of stripping does not arise.

While that two particular arrangements of a machine embodying the invention have been shown and described, it is evident that further changes and modifications are still possible without a departure from the spirit of the invention.

It will be understood by one skilled in the art that, with the tines 88 in other positions than those described so far, the conditionings spreading and/or windrowing characteristics thereof may be varied. It would be possible to obtain an even wider spreading and more aggressive conditioning effect by positioning the tines 88 so that, as viewed in the directions of rotation 102,103 of the drums 2, their outer ends lead the generally radial positions described above.

Also, the mower of the mower-conditioner according to the invention may be of a type other than the satellite mower type described so far. Indeed, the conditioner means according to the invention may be combined with a mower structure comprising a pair of rotary members rotatable at a first rotational speed about generally upright axes and at least one rotary cutter unit associated with each rotary member and rotatable at another rotational speed. In one arrangement one rotary cutter unit is provided coaxially with each rotary member and is driven at a rotational speed substantailly exceeding the rotational speed of the associated rotary member.

Having thus described the invention, what is claimed is:

1. A mower-conditioner comprising:
  a frame;
  a pair of rotary members on said frame for rotation about generally vertical axes at a first rotational speed, each said rotary member having at least one rotary cutter unit associated therewith, each said rotary cutter unit being rotatable at a second rotational speed to sever standing crop material;
  first and second sets of stationary tines mounted on said frame and corresponding, respectively, to said rotary members, said sets of stationary tines being angularly disposed with respect to each other between said rotary members; and
  first and second sets of rotating tines mounted, respectively, for rotation with said rotary members, each set of rotating tines being arranged to cooperate with both said first and second sets of stationary tines when passing between said rotary members to condition severed crop material therebetween, said rotating tines also being operable to engage crop material upon being severed by said rotary cutter units, carry the severed crop between the rotary members to condition the severed crop upon cooperation with said stationary tines and disengage the severed and conditioned crop material rearwardly of said rotary members.

2. The mower-conditioner of claim 1 wherein both the stationary tines and the rotating tines of each respective set are vertically spaced apart, said rotating tines being disposed to alternate with said stationary tines.

3. A mower-conditioner according to claim 2, wherein the stationary tines are mounted on the frame by respective support members which extend partially around the associated rotary member at the forward side thereof.

4. A mower-conditioner according to claim 3, wherein each stationary tine is adjustably mounted on the associated support member to permit the angle defined between corresponding stationary tines to be varied.

5. A mower-conditioner according to claim 4, wherein each stationary tine is mounted on the associated support member via resilient means which allows the tine to move relative to the support member to permit the passage of crop material between the two first sets of tines.

6. A mower-conditioner according to claim 5, wherein each support member is cantilevered from the frame and comprises a linear portion extending from the rear of the machine along one side thereof, and a curved portion extending partially around the front of the associated rotary member.

7. A mower-conditioner according to claim 6, wherein each support member is of U-section with the bridging limb being disposed vertically and towards the associated rotary member.

8. A mower-conditioner according to claim 6, wherein adjacent ends of corresponding tines of the two first sets terminate, in the nominal positions thereof, at substantially the same point.

9. A mower-conditioner according to claim 2 wherein each rotating tine has an elongated body portion mounted at one end on the associated rotary member and a tip portion spaced from the associated rotary member to engage crop material, said tip portion being inclined relative to the body portion of the tine.

10. A mower-conditioner according to claim 9 wherein each said rotating tine is adjustably mounted to permit each said rotating tine to be selectively positioned in at least two positions.

11. A mower-conditioner according to claim 10, wherein each rotating tine is of rod form and is mounted on the associated rotary member for rotational movement about the longitudinal axis of the body portion, latch means being provided to retain the tine in a selected position rotated about the axis of the body portion.

12. A mower-conditioner according to claim 11, wherein each rotating tine is mounted for rotary movement about the axis of the body portion by two spaced apart bracket means attached to the associated rotary member, each said rotating tine being journalled in a collar attached to one bracket means and also journalled in the other bracket means, the collar having an end face disposed between the two bracket means and formed with a cam surface having two diametrically opposed latch portions, a complementary cam surface being provided on a further collar attached to the tine and located between the two bracket means, the two cam surfaces being urged into contact by resilient means disposed between the further collar and said other bracket means and being capable of compression to permit axial movement of the further collar upon rotation of the tine, which movement is caused by the shape of the cam surfaces, so as to disengage the cooperating latch portions and permit tine rotation about the axis of the body portion through 180° whereupon the latch portions are re-engaged.

13. A mower-conditioner according to claim 9, wherein the at least one rotary cutter unit is mounted on the associated rotary member for rotation therewith about the generally upright axis thereof, and is rotatable about a further generally upright axis offset from the rotational axis of the respective rotary member.

14. A mower-conditioner according to claim 13, wherein two rotary cutter units are provided per rotary member.

15. A mower-conditioner according to claim 13, wherein the number of sets of rotating tines on each said rotary member is equal to the number of corresponding rotary cutter units.

16. A mower-conditioner according to claim 15, wherein the sets of rotating tines are located generally above respective rotary cutter units.

17. A mower-conditioner for severing standing crop material and conditioning the severed crop material to facilitate drying thereof, comprising:
   a frame;
   a pair of rotary members mounted on said frame for rotation about a pair of corresponding, generally vertical axes;
   cutting means connected to each of said rotary members for rotation about the corresponding said axis to sever standing crop material;
   crop engaging members affixed to each said rotary member for rotation therewith to engage crop material as it is being severed by said cutting means and convey said severed crop material rearwardly of said rotary members;
   stationary conditioning elements affixed to said frame and positioned within the path of rotation of said crop engaging members so as to be cooperable therewith to crimp severed crop material therebetween, said conditioning elements being vertically spaced in a staggered relationship relative to said crop engaging members, each said stationary conditioning element including a tine mounted on a support arm affixed to said frame, each said support arm including a curved portion partially encircling one of said rotary members and terminating forwardly of the corresponding said rotary member, the associated tine being mounted to the end of the curved portion; and
   drive means for rotatably powering said rotary members and said cutting means.

18. The mower-conditioner of claim 17, wherein each said tine is mounted to the corresponding said support arm such that it projects generally rearwardly between said rotary members.

19. The mower-conditioner of claim 18, wherein said stationary conditioning tines are arranged in two sets corresponding to said pair of rotary members, the tines on each set being disposed at an angle to the tines on the opposing set with the ends of opposing tines being positioned adjacent one another, such that when viewed from above said tines are positioned in a V-shaped pattern converging rearwardly.

20. The mower-conditioner of claim 19, wherein said crop engaging members project outwardly from the respective said rotary member a sufficient distance to be cooperable with both said sets of stationary conditioning tines.

21. The mower-conditioner of claim 20, wherein said crop engaging members are mounted on opposing sides of each said rotary member in a staggered vertically spaced relationship relative to said stationary conditioning tines, the crop engaging members on the opposing said rotary members being mounted for rotation therewith at approximately 90° out of phase relative to each other.

22. The mower-conditioner of claim 21, wherein each said crop engaging member is adjustably mounted to a bracket affixed to the corresponding said rotary member, each said crop engaging member having an end inclined at an angle to the axis of the crop engaging member, each said crop engaging member being adjustable such that said inclined end is selectively positionable in one of at least two positions, one of said positions having the inclined end trailing the direction of rotation, another of said positions having the inclined end leading the direction of rotation.

23. The mower-conditioner of claim 22, wherein said stationary tines are mounted on the respective said support arms through resilient members to permit a limited amount of flexible movement of each said tine relative to the corresponding said support arm.

24. The mower-conditioner of claim 19 or 23, wherein said cutting means includes a pair of cutter discs mounted on each said rotary member for rotation therewith, each said cutter disc also being rotatable about a second axis of rotation spaced from the axis of rotation of the respective said rotary member.

25. The mower-conditioner of claim 25, wherein each said cutter disc includes at least one knife mounted thereon for engagement with standing crop material to merit from the ground, each said cutter disc being driven by said drive means such that the peripheral speed of said knives is greater than the peripheral speed of said crop engaging members.

* * * * *